M. A. DIETZ.

Lamp.

No. 1,032.

Reissued Sept. 4, 1860.

N. PETERS, Photo Lithographer, Washington, D. C.

UNITED STATES PATENT OFFICE.

MICHAEL A. DIETZ, OF BROOKLYN, NEW YORK.

IMPROVEMENT IN LAMPS.

Specification forming part of Letters Patent No. 23,160, dated September 8, 1858; Reissue No. 1,032, dated September 4, 1860.

*To all whom it may concern:*

Be it known that I, MICHAEL A. DIETZ, of Brooklyn, State of New York, have invented a new and useful Improvement in Lamps, of which the following is a full, clear, and exact description, reference being had to the accompanying drawings, making part of this specification, in which—

Figure 1:
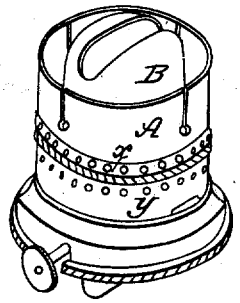
Figure 2:
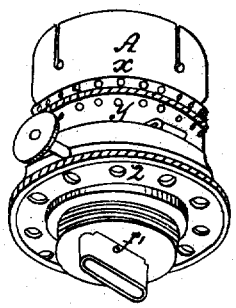
Figure 3:
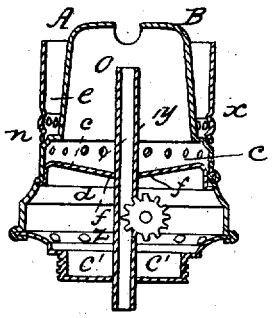
Figure 4:
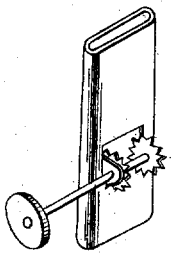

Figure 1 represents a perspective view of a lamp-top detached from the oil-chamber or body of the lamp, having my improvements applied thereto; Fig. 2, a similar view showing the under side of the top; Fig. 3, a vertical section of the same; Fig. 4, a perspective view of the wick-tube with the spindle and feed-wheels detached.

My improvement relates to that class of flat-wick lamps provided with a cone or deflector, such as is now in general use, for burning coal or kerosene oil and other such fluids. These as heretofore constructed have been provided with two rows of apertures, or, what is the same thing, one row divided into two parts, for the admission of air into the interior of the lamp-top, the upper row being so arranged as to admit a current of fresh air between the outside of the cone and the inside of the chimney, and the lower row or half so arranged as to admit air into the interior of the cone immediately at its lower or bottom edge; the purpose of the first row being to prevent the overheating of the cone and chimney and the creation of a vacuum between the chimney and cone by the expulsion of the air on the inside of the chimney by the action of the heat, and for the further purpose of supplying air to the flame on the outside of the cone, the second row of holes being arranged immediately at the lower edge of the cone to admit fresh air into its interior with the intention of supplying the requisite amount of oxygen to the flame by being forced into it by the curved shape of the cone. Thus constructed, experience has shown that the combustion of the oil was imperfect, a large portion escaping in the room unconsumed, creating an exceedingly obnoxious odor, while the flame was far from being as brilliant, and hence as illuminating, as might be desired, burning with a flickering and irregular light. These defects, it has been discovered, are in a great measure to be attributed to the manner in which the air is supplied to the flame on the inside of the cone or deflector, as by admitting it directly into the interior of the cone immediately at its lower or bottom edge through the lower row of openings cut in the sides of the chimney-band the fluctuations of the air in the room around the lamp are communicated directly to the flame, and also because on the admission of the air into the interior of the cone it is repulsed by the heated air or gas contained in the cone-chamber, and caused to ascend along the inner side of the deflector and to mingle with the gaseous products evolved from the lamp at the upper part of the flame, little, if any, of the air so flowing in diffusing itself throughout the cone-chamber as to mingle with the gaseous products at the lower part of the flame—that is to say, from the wick upward. Another cause of this imperfect combustion, but which is incidental to this mode of supplying the fresh air to the interior of the cone immediately at the lower edge of the latter, (arising from the imperfect diffusion of the cold air throughout the chamber so as to cool the wick-tube and heat itself to the requisite degree to promote combustion), is this: that just in proportion as the deflector or cone becomes highly heated it heats the wick-tube which it incloses, the peculiar shape of the former heating the latter as well by radiation as reflection, thereby causing the wick-tube to evaporate the oil more rapidly than is necessary for the regular supply of the flame, and more rapidly than can be thoroughly consumed from the limited supply of oxygen, as presented to it by the old mode of constructing the lamps.

To obviate these defects and to provide a flat-wick lamp that will give a clear, steady, and brilliant light with less consumption of oil, or a more thorough combustion of the oil, is one of the objects of my present improvement, for which purpose I combine with the deflector or cone of the lamp an air chamber or reservoir, into which the air intended for the interior of the cone is first made to enter and to diffuse itself, and so arranged as that the air shall then pass upward into the cone-chamber, where it also diffuses itself and is then fed into the flame from the wick upward, a portion in its ascent being brought in contact with the wick-tube, cooling it and being heated in turn previous to being brought into contact with the flame, and therefore, according to the degree in which it has been heated, better calculated to promote combustion.

The next branch of my improvement in flat-wick lamp-tops relates to the generation of gas by the heated wick-tube from the oil chamber. These tops as previously constructed had no provision for the escape of gas from the oil-chamber other than what could find vent or escape through the interstices or small spaces left between the male screw of the lamp-top and the female screw into which it took in the neck or mouth of the lamp, and therefore liable to explosion where there was not sufficient space for its escape; but where such escape was effected as insuperable an objection was created, as it caused an exceedingly offensive odor in the room, which few persons would tolerate, and therefore offered a serious drawback to their introduction into general use, to remedy which I provide an opening in the bottom plate of the lamp-top, through which these gases escape into the air chamber and there mingle with the air, and with the latter pass up into the cone-chamber above, where these are fed into the flame and consumed with the other vapors generated from the oil in the wick.

To enable others skilled in the art to make, construct, and use my improvements, I will now proceed to describe the best modes known to me of carrying them into effect, omitting a particular description of such parts of the lamp-top as were well known previous to my present invention and not essential to a full and complete understanding of them, here premising that in the accompanying drawings my improvements are represented in connection with the lamp-top in which the cone or deflector is united or permanently secured to the chimney-band, although it is equally as applicable to lamp tops in which the deflector is loose—that is to say, removable at will, it being made to fit into a chimney-band formed on or otherwise secured to the body of the lamp-top, the manner of fitting in or otherwise securing the deflector to the lamp-top being simply a matter of judgment, not of necessity, for the purposes of my present improvement, and that wholly irrespective of the shape or design of the lamp-top, so long as it is provided with a flat wick, a cone chamber, and an air chamber or reservoir arranged immediately below the latter, into which the air is admitted and allowed to diffuse itself previous to passing upward into the cone-chamber above, and this without regard to any particular form, shape, construction, and arrangement of the air-chamber other than its being arranged at a point below that of the cone-chamber, and so that the air may diffuse itself throughout the latter in passing up from the former, and so that a portion may be brought in contact with the wick-tube previous to being fed into the flame—as, for example, it may either consist of the entire space formed by the shell of the lamp-top without the intervention of any plate of metal between it and the cone-chamber, or that space so formed and a perforated diaphragm, either secured to the lower edge of the deflector or otherwise, forming the upper plate of the lamp-top; or it may consist of this space divided into two chambers by a perforated annular diaphragm surrounding the wick tube, so long as there are the requisite number of small apertures cut in the sides of the shell of the lamp-top to provide for the requisite supply of fresh air to the air-chamber.

The lamp-top represented in the drawings to which my improvements are applied consists of two principal parts connected together by a hinge, the first of which is that part of the lamp-top that supports the wick-tube, and which in turn is secured to the mouth of the oil chamber or body of the lamp by a male screw-thread cut on its lower extremity, taking into a female screw-thread cut in the mouth of the oil chamber or reservoir; and the second is the burner consisting of the cone or deflector B and chimney-band A, suitably secured together by means of a flange, *n*, formed on the lower edge of the cone, taking into a groove formed in the chimney band. Immediately above and below this groove are pierced, respectively, a series of holes, the one series, *y*, being for the admission of air to the flame on the inside of the cone, and the other series, *x*, on the outside, the latter being for the further purpose of insulating the glass chimney from the action of the heat evolved from the flame and heated cone or deflector by interposing a cool current of air between them, this current being induced by the action of the heat of the flame, which, as it ascends the chimney, naturally creates a strong current as well through the upper as lower series of holes, the band or support A for the chimney for this purpose being so formed as to present a sort of annular projection, *c*, on its inside, immediately above the upper row of holes, *x*, to prevent the chimney from descending so far as to close the communication of the upper series of holes with its inside. Thus constructed, the lamp-top does not supply the requisite amount of oxygen to the flame in a suitable and proper manner for the entire consumption of the oil as fast as it is generated into gas or gaseous vapors as, instead of the air being brought into contact with the flame throughout its entire surface, it is merely brought into contact with the latter at its top, the coolest part of the flame, and therefore cooling it still further, which, while it may supply oxygen, instead of assisting combustion actually diminishes it, and allows a large portion of the gas to escape unconsumed, its temperature being reduced too low to insure combustion, to remedy which I arrange an air-chamber, *d*, immediately below the cone-chamber *g*, in this instance between the shell-plate *c'* and upper plate, *e*, of that part of the lamp-top to which the wick-tube is secured, having outlets or openings

*z*, communicating with the open air, and other openings, *f*, in the upper plate communicating with the chamber *o* of the cone B on the one side and the air-chamber *d* on the other, in this instance these being so arranged as to cause the air passing from the air-chamber below to pass up along the sides of the wick-tube, cooling the latter in its ascent until it comes in contact with the flame, mingling with the latter as well at its lower as upper portion.

The air in its ascent as it cools the wick-tube and diffuses itself through the heated cone-chamber becomes heated to the requisite degree, or nearly so, to mix with the flame without cooling it to such extent as to injuriously affect or impair its burning, but, on the contrary, materially increases the brilliancy of the light obtained and consumes the smoke, which would otherwise escape were there no such combination of an air chamber.

Instead of there being but two apertures formed in the upper plate communicating with the air-chamber *d* and the chamber *o*, as many small apertures may be formed as may be deemed advisable, in which event the lower series of holes, *y*, may be omitted altogether, without materially affecting the burning of the lamp, care being taken to make the openings in the upper plate of a sufficient size and number to supply the requisite amount of oxygen to the flame; or the whole upper plate may be removed entirely, in which case the size of the openings of the air-chamber communicating with the open air should be lessened and their number increased, so as to steady and regulate the supply, and the depth of the chamber, if anything, increased, so as to give time to the air to diffuse itself throughout the chamber previous to its passage upward into the cone-chamber above, into which it would thus enter in a diffused state, cooling the wick-tube in its ascent and in a measure acquiring the requisite degree of heat before mixing with the flame to promote combustion.

In the lower plate, *c'*, which separates the air-chamber *d* from the oil-chamber below, are cut openings, *f'*, either at the sides of the wick-tube or at any other suitable points, so that any gaseous vapors generated by the action of the heated wick-tube or lamp-top will pass up from the oil-chamber through the air-chamber into the cone-chamber *o* above by the holes communicating between them, and there mix with the flame and air and be consumed, thus avoiding any disagreeable smell or odor by its escape unconsumed into the room, this same passage also serving, should occasion require, to conduct such oil as may happen to overflow the wick-tube back into the oil-chamber again.

From the foregoing description and specification of my invention it will be apparent that many different modes of carrying it into execution may be described to suit the various forms of lamp-tops; but as they would be simple modifications for that purpose, and no departure from the principle of my invention, it is deemed here unnecessary so to do, as they will readily suggest themselves to suit the various forms or styles.

Having thus described my invention, what I claim as new in flat-wick lamps, and desire to secure by Letters Patent, is—

1. An air-chamber, in combination with the chamber formed by the concavity of the deflector of a lamp-top, substantially as described.

2. The combination of an air-chamber for supplying air to the interior of the cone with openings for the admission of air on the outside of the cone between the latter and the inside of the chimney, substantially as set forth.

In testimony whereof I hereunto set my hand to this specification.

MICHAEL A. DIETZ.

Witnesses:
JAS. M. DIETZ,
ROBERT E. DIETZ.